United States Patent [19]
Gillespie

[11] Patent Number: 5,730,099
[45] Date of Patent: Mar. 24, 1998

[54] REDUCED EMISSION TWO-STROKE ENGINE AND METHOD OF ENGINE OPERATION TO REDUCE ENGINE EMISSION

[75] Inventor: George T. Gillespie, Littlehampton, England

[73] Assignee: Outboard Marine Corporation, Waukegan, Ill.

[21] Appl. No.: 701,592

[22] Filed: Aug. 22, 1996

[51] Int. Cl.$^6$ ............................. F02D 43/00; F02B 75/10
[52] U.S. Cl. ........................... 123/295; 123/305; 60/274; 60/285
[58] Field of Search ....................... 123/295, 303, 123/305; 60/274, 285, 282

[56] References Cited

U.S. PATENT DOCUMENTS

| | | | |
|---|---|---|---|
| 3,441,381 | 4/1969 | Keith et al. | 23/288 |
| 3,644,098 | 2/1972 | De Palma et al. | 23/288 |
| 3,645,093 | 2/1972 | Thomas | 60/30 |
| 3,692,497 | 9/1972 | Keith et al. | 23/288 |
| 3,854,888 | 12/1974 | Frietzsche et al. | 23/288 |
| 3,861,881 | 1/1975 | Nowak | 23/288 |
| 3,892,537 | 7/1975 | Gulati et al. | 23/288 |
| 3,957,445 | 5/1976 | Foster | 23/288 |
| 4,106,287 | 8/1978 | Auclair et al. | 60/274 |
| 4,132,209 | 1/1979 | Resler, Jr. | 123/169 |
| 4,233,811 | 11/1980 | Masaki | 60/274 |
| 4,235,846 | 11/1980 | Abthoff et al. | 422/171 |
| 4,238,456 | 12/1980 | Jalbing | 422/172 |
| 4,256,700 | 3/1981 | Smith et al. | 422/177 |
| 4,261,170 | 4/1981 | Suzuki | 60/302 |
| 4,278,639 | 7/1981 | Tadokoro et al. | 422/171 |
| 4,285,909 | 8/1981 | Mizusawa et al. | 422/179 |
| 4,328,187 | 5/1982 | Musall et al. | 422/179 |
| 4,335,077 | 6/1982 | Santiago et al. | 422/179 |
| 4,335,078 | 6/1982 | Ushijima et al. | 422/179 |
| 4,347,219 | 8/1982 | Noritake et al. | 422/180 |
| 4,353,872 | 10/1982 | Midorikawa | 422/179 |
| 4,353,873 | 10/1982 | Noritake et al. | 422/179 |
| 4,397,817 | 8/1983 | Otani et al. | 422/179 |
| 4,495,153 | 1/1985 | Midorikawa | 422/171 |
| 4,581,206 | 4/1986 | Otani et al. | 422/171 |
| 4,629,605 | 12/1986 | Santiago | 422/179 |
| 5,050,551 | 9/1991 | Morikawa | 123/305 |

*Primary Examiner*—Andrew M. Dolinar
*Attorney, Agent, or Firm*—Jones, Day, Reavis & Pogue

[57] ABSTRACT

Disclosed herein is a method of operating a two-stroke internal combustion engine so as to promote reduction in engine exhaust emissions, which two-stroke internal combustion engine includes a combustion chamber, a pump operable to periodically pump air unmixed with fuel into the combustion chamber, a fuel injector communicating directly with the combustion chamber and operable to periodically inject fuel unmixed with air directly in the combustion chamber to provide a fuel charge, an ignition system operable to periodically ignite the fuel charge in the combustion chamber, and an exhaust system including an exhaust manifold communicating with the combustion chamber and operable to produce, in the engine exhaust gas, a thermal reaction so as to reduce engine exhaust emissions, which method includes the steps of pumping air unmixed with fuel to the combustion chamber, injecting fuel unmixed with air directly into the combustion chamber so as to provide a fuel charge and at an injecting timing which is retarded from the optimum injection timing for minimum fuel emissions and fuel consumption in an engine without thermal reaction within the exhaust system and in an amount so as to provide an air to fuel ratio which is richer than the optimum air to fuel ratio for minimum HC emissions without a thermal reaction in the exhaust system, and igniting the fuel charge at an ignition timing which is retarded from minimum spark advance for best torque.

13 Claims, 1 Drawing Sheet

REDUCED EMISSION TWO-STROKE ENGINE AND METHOD OF ENGINE OPERATION TO REDUCE ENGINE EMISSION

BACKGROUND OF THE INVENTION

The invention relates generally to outboard motors, and more particularly, to two-stroke internal combustion engines which are commonly employed in outboards motors.

The use of direct in-cylinder (combustion chamber) fuel injection to reduce fuel consumption, improve light load operation and reduce exhaust emissions of a two-stroke cycle engine, is known. These improvements in the performance of a two-stroke engine result directly from the additional degree of control that direct in-cylinder fuel injection gives the engine designer, in connection with the timing and position of the introduction of the fuel into the engine cylinder. It is possible under many operating conditions to delay the injection event until after the exhaust port has closed on the compression stroke. This "closed cycle" injection (injection when the exhaust port is closed) eliminates the direct short-circuiting of raw fuel into the exhaust system and has the dual benefit of reducing both fuel consumption and exhaust HC emissions. In addition, if the fuel can be introduced into the cylinder as a stratified charge, the combustion event can be contained within a small volume. This controlled and stratified combustion greatly improves the light load running characteristics of a two-stroke engine with associated reductions in fuel consumption and exhaust emissions.

However, as the engine speed and load increases, advancement of the start of the fuel injection event within the engine cycle becomes necessary. This advance is required to provide adequate fuel vaporization and air-fuel mixing time, and results in fuel being injected into the cylinder during the "open cycle", i.e., when the exhaust port is open. The unavoidable consequence of having fuel present in the engine during the open cycle, i.e., when the exhaust port is open, is that a portion of the fuel short-circuits directly into the exhaust system. This results in a considerable and significant increase in the exhaust HC emissions, as well as some deterioration in the fuel consumption.

Methods for controlling this outflow of raw fuel are known, such as by speed and throttle dependent variable exhaust port timing and asymmetric exhaust port timing. These techniques add cost and complexity to the engine. Another known methods of controlling the emissions of a two-stroke engine, employs the use of a catalytic converter within the exhaust system. Use of a catalytic converter also adds cost and complexity to the engine and, as with the mechanical devices, does not permit the simultaneous reduction in HC, CO and $NO_x$ emissions in a stratified charge, 2-stroke engine.

Attention is directed to the following U.S. patents:

U.S. Pat. No. 3,441,381, Keith et al., issued Apr. 29, 1969
U.S. Pat. No. 3,644,098, De Palma et al., issued Feb. 22, 1972
U.S. Pat. No. 3,645,093, Thomas, issued Feb. 29, 1972
U.S. Pat. No. 3,692,497, Keith et al., issued Sep. 19, 1972
U.S. Pat. No. 3,954,888, Frietzsche et al., issued Dec. 17, 1974
U.S. Pat. No. 3,861,881, Nowak, issued Jan. 21, 1975
U.S. Pat. No. 3,892,537, Gulati et al., issued Jul. 1, 1975
U.S. Pat. No. 3,957,445, Foster, issued May 18, 1976
U.S. Pat. No. 4,106,287, Auclair et al., issued Aug. 15, 1978
U.S. Pat. No. 4,132,209, Resler, Jr., issued Jan. 2, 1979
U.S. Pat. No. 4,233,811, Masaki, issued Nov. 18, 1980
U.S. Pat. No. 4,235,846, Abthoff et al., issued Nov. 25, 1980
U.S. Pat. No. 4,238,456, Jalbing, issued Dec. 9, 1980
U.S. Pat. No. 4,256,700, Smith et al., issued Mar. 17, 1981
U.S. Pat. No. 4,261,170, Suzuki, issued Apr. 14, 1981
U.S. Pat. No. 4,278,639, Tadokoro et al., issued Jul. 14, 1981
U.S. Pat. No. 4,285,909, Mizusawa et al., issued Aug. 25, 1981
U.S. Pat. No. 4,328,187, Musall et al., issued May 4, 1982
U.S. Pat. No. 4,335,077, Santiago et al., issued Jun. 15, 1982
U.S. Pat. No. 4,335,078, Ushijima et al., issued Jun. 15, 1982
U.S. Pat. No. 4,347,219, Noritake et al., issued Aug. 31, 1982
U.S. Pat. No. 4,353,872, Midorikawa, issued Oct. 12, 1982
U.S. Pat. No. 4,353,873, Noritake et al., issued Oct. 12, 1982
U.S. Pat. No. 4,397,817, Otani et al., issued Aug. 9, 1983
U.S. Pat. No. 4,495,153, Midorikawa, issued Jan. 22, 1985
U.S. Pat. No. 4,581,206, Otani et al., issued Apr. 8, 1986
U.S. Pat. No. 4,629,605, Santiago, issued Dec. 16, 1986

SUMMARY OF THE INVENTION

The invention provides a method of operating a two-stroke internal combustion engine so as to promote reduction in engine exhaust emissions, which two-stroke internal combustion engine includes a combustion chamber, a pump operable to periodically pump air unmixed with fuel into the combustion chamber, a fuel injector communicating directly with the combustion chamber and operable to periodically inject fuel unmixed with air directly in the combustion chamber to provide a fuel charge, an ignition system operable to periodically ignite the fuel charge in the combustion chamber, and an exhaust system including an exhaust manifold communicating with the combustion chamber and operable to produce, in the engine exhaust gas, a thermal reaction so as to reduce engine exhaust emissions, which method includes the steps of pumping air unmixed with fuel to the combustion chamber, injecting fuel unmixed with air directly into the combustion chamber at a selected injecting timing and in a selected amount, igniting the fuel charge at a selected ignition timing, and controlling the fuel injection and the ignition timing so as to achieve a rate of combustion slower than that which occurs when ignition timing provides best torque and when fuel is injected at a timing so as to produce minimum fuel emissions and fuel consumption without thermal reaction within the exhaust system and in an amount so as to obtain optimum air to fuel ratio for minimum HC emissions without a thermal reaction in the exhaust system.

The invention also provides a method of operating a two-stroke internal combustion engine so as to promote reduction in engine exhaust emissions, which two-stroke internal combustion engine includes a combustion chamber, a pump operable to periodically pump air unmixed with fuel into the combustion chamber, a fuel injector communicating directly with the combustion chamber and operable to periodically inject fuel unmixed with air directly in the combustion chamber to provide a fuel charge, an ignition system operable to periodically ignite the fuel charge in the combustion chamber, and an exhaust system including an exhaust manifold communicating with the combustion chamber and operable to produce, in the engine exhaust gas, a thermal reaction so as to reduce engine exhaust emissions, which method includes the steps of pumping air unmixed with fuel to the combustion chamber, injecting fuel unmixed with air directly into the combustion chamber so as to provide a fuel charge and at an injecting timing which is retarded from the optimum injection timing for minimum fuel emissions and fuel consumption in an engine without thermal reaction within the exhaust system and in an amount so as to provide an air to fuel ratio which is richer than the optimum air to fuel ratio for minimum HC emissions without a thermal reaction in the exhaust system, and igniting the fuel charge at an ignition timing which is retarded from minimum spark advance for best torque.

The invention also provides a method of operating a two-stroke internal combustion engine so as to promote reduction in engine exhaust emissions, which two-stroke internal combustion engine includes a combustion chamber, a crankcase operable to periodically pump air unmixed with fuel into the combustion chamber, a fuel injector communicating directly with the combustion chamber and operable to periodically inject fuel unmixed with air directly in the combustion chamber to provide a stratified fuel charge, an ignition system operable to periodically ignite the fuel charge in the combustion chamber, and an exhaust system including an exhaust manifold communicating with the combustion chamber and being operable to produce in the engine exhaust gas a thermal reaction so as to reduce engine exhaust emissions, which method includes the steps of pumping air unmixed with fuel to the combustion chamber, injecting fuel unmixed with air directly into the combustion chamber so as to provide a stratified fuel charge and at an injecting timing which is 10 degrees to 30 degrees retarded from the optimum injection timing for minimum fuel emissions and fuel consumption in an engine without thermal reaction within the exhaust system and in an amount so as to provide an air to fuel ratio which is one to three times richer than the optimum air to fuel ratio for minimum HC emissions without a thermal reaction in the exhaust system, and igniting the stratified fuel charge at an ignition timing which is 0 degrees to 15 degrees retarded from minimum spark advance for best torque.

The invention also provides a two-stroke internal combustion engine including a combustion chamber, a pump operable to periodically pump air unmixed with fuel into the combustion chamber, a fuel injector communicating directly with the combustion chamber and operable to periodically inject fuel unmixed with air directly in the combustion chamber to provide a fuel charge, an ignition system operable to periodically ignite the fuel charge in the combustion chamber, an electronic control unit which is connected to the fuel injector and to the ignition system, which is operable to effect fuel injection directly into the combustion chamber so as to provide a fuel charge and at an injecting timing which is retarded from the optimum injection timing for minimum fuel emissions and fuel consumption in an engine without thermal reaction within the exhaust system and in an amount so as to provide an air to fuel ratio which is richer than the optimum air to fuel ratio for minimum HC emissions without a thermal reaction in the exhaust system, and which is operable to effect operation of the ignition system at an ignition timing which is retarded from minimum spark advance for best torque, and an exhaust system including an exhaust manifold which communicates with the combustion chamber and which is operable to produce in the engine exhaust gas a thermal reaction so as to reduce engine exhaust emissions.

The invention also provides a two-stroke internal combustion engine including a combustion chamber, a crankcase operable to periodically pump air unmixed with fuel into the combustion chamber, a fuel injector communicating directly with the combustion chamber and operable to periodically inject fuel unmixed with air directly in the combustion chamber to provide a stratified fuel charge, an ignition system operable to periodically ignite the fuel charge in the combustion chamber, an electronic control unit which is connected to the fuel injector and to the ignition system, which is operable to effect fuel injection directly into the combustion chamber so as to provide a stratified fuel charge and at an injecting timing which is 10 degrees to 30 degrees retarded from the optimum injection timing for minimum fuel emissions and fuel consumption in an engine without thermal reaction within the exhaust system and in an amount so as to provide an air to fuel ratio which is one to three times richer than the optimum air to fuel ratio for minimum HC emissions without a thermal reaction in the exhaust system, and which is operable to effect operation of the ignition system at an ignition timing which is 0 degrees to 15 degrees retarded from minimum spark advance for best torque, and an exhaust system including an exhaust manifold which communicates with the combustion chamber and which is operable to produce in the engine exhaust gas a thermal reaction so as to reduce engine exhaust emissions.

While the use of a thermal reactor within the exhaust manifold of a two-stroke engine is not novel, the addition of direct in-cylinder fuel injection makes it possible to greatly enhance the ability to reduce exhaust emissions of a two-stroke cycle engine. More specifically, by suitably adjusting the in-cylinder injection timing, the injected fuel quantity, and the ignition timing, it is possible to create both in-cylinder and exhaust manifold conditions such that the emissions of HC, CO and $NO_x$ are significantly reduced in a manner not possible with carbureted engines.

Other features and advantages of the invention will become apparent to those skilled in the art upon review of the following detailed description, claims and drawings.

Figure 1:
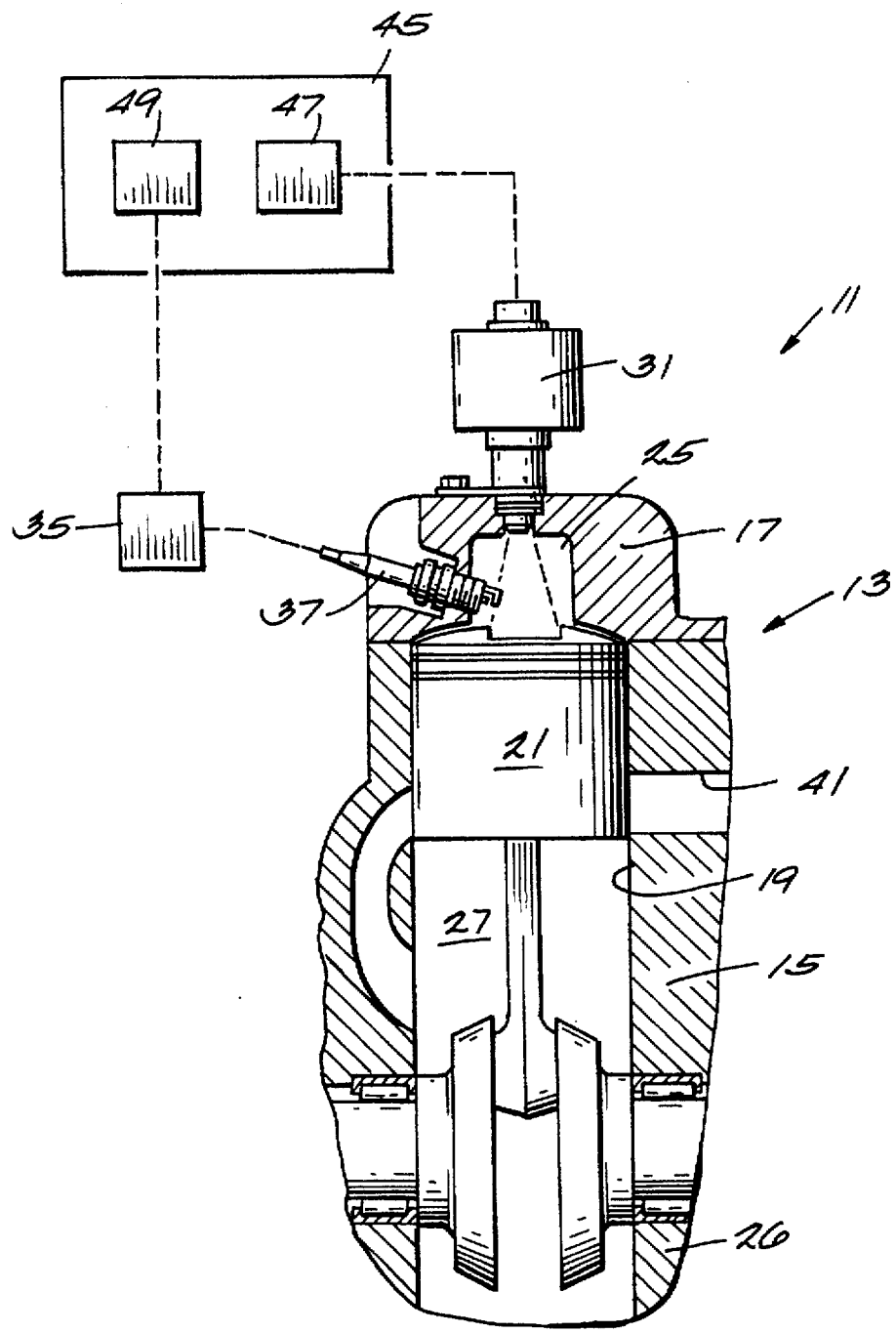
FIG. 1 is a schematic view of an internal combustion engine embodying various of the features of the invention.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DESCRIPTION OF THE PREFERRED EMBODIMENT

Shown in FIG. 1 of the drawings is a two-stroke internal combustion engine 11 including an engine block assembly 13 comprising a cylinder block 15 and a cylinder head 17.

The cylinder block 15 defines one or more cylinder(s) 19 respectively receiving piston(s) 21 which cooperate with the cylinder(s) 19 and the cylinder head 17 to define a corresponding number of combustion chamber(s) 25. The engine block 15, together with a cooperating crankcase cover 26, defines a corresponding number of sealed crankcase(s) 27 operable, incident to reciprocation of the piston(s) 21, to periodically pump air unmixed with fuel into the combustion chamber(s) 25.

The engine 11 also includes, for each combustion chamber 25, a fuel injector 31 which communicates directly with the associated combustion chamber 25 and which is operable to periodically inject fuel unmixed with air directly in the associated combustion chamber 25 to provide therein a stratified fuel charge. In addition, the engine 11 includes an ignition system 35 which, in part, is shown schematically, which includes one or more spark plug(s) 37 corresponding in number to the number of combustion chamber(s) 25 and respectively extending into the combustion chamber(s) 25, and which is operable to periodically ignite the fuel charges in the combustion chamber(s) 25.

Still further in addition, the engine 11 includes an exhaust manifold 41 which communicates with the combustion chamber(s) 25 and which can constitute a thermal reactor, together with an electronic control unit 45 which is shown schematically and which is operably connected to the fuel injector(s) 31 and to the ignition system 35.

As thus far disclosed, the construction is conventional.

In order to produce, in the engine exhaust gas, a thermal reaction so as to reduce engine exhaust emissions, the electronic control unit 45 includes means 47 which is shown schematically, which is connected to the fuel injector(s) 31, and which is operable to effect fuel injection directly into the combustion chamber so as to provide a stratified fuel charge and at an injecting timing which is retarded from the optimum injection timing for minimum fuel emissions and fuel consumption in an engine without thermal reaction within the exhaust system and in an amount so as to provide an air to fuel ratio which is richer than the optimum air fuel ratio for minimum HC emissions without a thermal reaction in the exhaust system.

It is preferred that the fuel injection retardation be from about 10 degrees to about 30 degrees.

It is also preferred that the air to fuel ratio be from about one to about three times richer.

In addition, the electronic control unit 45 includes means 49 which is shown schematically, which is connected to the ignition system 35 (and the spark plug(s) 37), and which is operable to effect sparking operation of the spark plug(s) at an ignition timing which is retarded from minimum spark advance for best torque.

It is preferred that the ignition retardation be from 0 to 15 degrees.

It is believed that anyone skilled in the art of designing and making electronic control units will be able to design and make the electronic control unit 45 which is operationally described above without a complete and detailed explanation of the interior construction thereof and, thus, such a complete and detailed explanation has been omitted.

The disclosed electronic control unit is operable to cause engine operation in accordance with a method including the steps of pumping air unmixed with fuel to the combustion chamber, injecting fuel unmixed with air directly into the combustion chamber so as to provide a stratified fuel charge and at an injecting timing which is retarded from the optimum injection timing for minimum fuel emissions and fuel consumption in an engine without thermal reaction within the exhaust system and in an amount so as to provide an air to fuel ratio which is richer than the optimum air to fuel ratio for minimum HC emissions without a thermal reaction in the exhaust system, and igniting the stratified fuel charge at an ignition timing which is retarded from minimum spark advance for best torque.

In one embodiment of the method of the invention, the step of injecting fuel is retarded by 0 to 15 degrees.

In one embodiment of the method of the invention, the step of injecting fuel provides an air to fuel ratio which is one to three time richer.

In one embodiment of the method of the invention, the step of igniting the fuel charge is retarded by 10 to 30 degrees.

While the disclosed construction contemplates pumping of air to the cylinder from the engine crankcase(s) 27, as is well known in the art, other pumping arrangements can be employed.

As disclosed above, there are three control parameters which are adjusted to create the thermal reaction within the exhaust manifold. These adjustments are as follows:

Ignition Timing—0 degrees to 15 degrees retarded from the minimum spark advance for best torque, i.e., basically the optimum power and fuel efficiency operating point.

Injection Timing—10 degrees to 30 degrees retarded from the optimum injection timing for minimum emissions and fuel consumption in an engine without a thermal reaction within the exhaust system.

Air/Fuel Ratio—1 to 3 times richer than the optimum air to fuel ratio for minimum HC emissions without a thermal reaction in the exhaust system.

It is noted that the above control parameters can be affected by other engine parameters, such as such as engine exhaust tuning, injector spray characteristics, engine coolant temperature and exhaust manifold design.

The above mentioned modifications or adjustments achieve a slower rate of combustion, thereby resulting in an increase in the exhaust gas temperature as the exhaust gas exits the cylinder. It is noted that anything which contributes to increasing the exhaust gas temperature, such as a hotter coolant temperature or an exhaust system design which keeps the exhaust gas at a higher temperature for a longer period of time, will tend to minimize the adjustment required to the control parameters.

Likewise, an injection system which injects the fuel in larger droplets, say 30 um SMD (Sauter Mean Diameter), will tend to result in slower combustion for a given injection timing and will tend to reduce the modifications needed to the control parameters. However, from an overall fuel efficiency and maximum power point of view, it is much more desirable to have an injection system which delivers the fuel in droplets of approximately 10 um SMD.

One significant advantage of the disclosed construction and method is that a significant increase in the quantity of oxygen present within the exhaust gases is obtained. More specifically, the conditions necessary to produce a thermal reaction within the exhaust manifold of an engine are a fuel rich oxidizing environment and an environment temperature in excess of 600 degrees C. Within the manifold of a carbureted two-stroke engine, whilst there may be a fuel rich environment at a temperature in excess of 600 degrees C., there is a limited quantity of oxygen present. This limits the potential of this technique. However, with a suitably designed stratified charge provided by in-cylinder fuel injection, the engine can be operated at air-fuel ratios considerably leaner than stoichiometric. This results in a significant increase in the quantity of oxygen present within the exhaust gases.

Another significant advantage of the disclosed construction and method is that the fuel entering the exhaust manifold is highly vaporized and in a heated state. More specifically, a significant difference, between carbureted and fuel injected two-stroke engines, is the condition of the raw fuel within the exhaust manifold. The majority of the raw fuel present within the exhaust of a carbureted engine has directly short-circuited the combustion process and has never been exposed to the combustion temperatures. However, the majority of the fuel within the exhaust system of a direct injected engine has been exposed to the combustion temperatures, due to the relatively retarded injection timings, and it is entirely reasonable to expect that this fuel will be in a highly vaporized and heated state. This fuel will be much more rapidly and easily oxidized than the relatively cold fuel emitted by a carbureted engine.

Still more particularly, in the disclosed construction and method, the excess oxygen and vaporized fuel, in combination with an ignition timing that is retarded at least 10 degrees from MBT, (the minimum spark advance for best torque; basically the optimum power and fuel efficiency operating point) provide the reactants and heat necessary to promote a thermal reaction in the exhaust manifold. This reaction is further enhanced when the engine is operated at an air to fuel ratio richer than the air to fuel ratio for best HC emissions without thermal reaction and if the injection timing is retarded by up to 10 degrees. This heated excess fuel feeds the thermal reaction and helps increase the exhaust manifold gas temperatures. These increased temperatures promote a more rapid reaction and compensate for the limited residence time available within the exhaust manifold. With these exhaust conditions present it is possible to reduce the HC and CO emissions by over 65% and 30% respectively. The $NO_x$ emissions are also reduced due to the more retarded ignition timing, with reductions of 40% possible.

The construction disclosed herein provides apparatus and method for controlling the emission output of a direct in-cylinder fuel injected two-stroke engine that requires no additional engine complexity and has the additional benefit of concurrently reducing HC, CO and $NO_x$ emissions.

Another advantage of the disclosed construction is the ability to reduce the exhaust emissions in a conventional or stock exhaust system. More specifically, the disclosed construction permits utilization in a engine which is conventional and without other physical modifications, except for modification of the timing parameters within the control system.

Still another advantage of the invention is that, in an operational mode which obtains elevated exhaust gas temperatures in the exhaust system, the reductions in HC and CO emissions can be obtained without a similar increase in fuel consumption.

In summary, the HC and CO emissions are reduced due to thermal reaction within the exhaust manifold. This thermal reaction is created by:

A. Retarding the ignition timing—this makes the combustion period start later in the cycle. Consequently, the cylinder gas is hotter as it leaves the cylinder because the gas does not have as long to cool after the combustion has finished.

B. Retarding the injection timing—this reduces the time for the injected fuel and cylinder air to mix, and results in a slower rate of combustion. Therefore, the combustion period lasts longer and the gas is hotter as it enters the exhaust.

C. Increasing the fuel flow—this injects more fuel into the cylinder. Not all of this additional fuel is burnt within the cylinder and the excess fuel feeds the reaction within the exhaust and helps maintain the exhaust reaction.

D. As the engine employs direct in-cylinder (combustion chamber) fuel injection, with the majority of the fuel being injected after the exhaust port has closed, the gas that is short-circuited directly out of the exhaust port during the scavenging process is almost pure air. This provides a good supply of oxygen to feed the thermal reaction within the exhaust. (On a carbureted engine this short-circuited gas contains raw fuel as well as the oxygen.)

In the disclosed construction, the $NO_x$ emissions are reduced due to the retarded ignition timing, as is well known in the a prior art.

Various of the features are set forth in the following claims.

I claim:

1. A method of operating a two-stroke internal combustion engine so as to promote reduction in engine exhaust emissions, which two-stroke internal combustion engine includes a combustion chamber, a pump operable to periodically pump air unmixed with fuel into the combustion chamber, a fuel injector communicating directly with the combustion chamber and operable to periodically inject fuel unmixed with air directly in the combustion chamber to provide a fuel charge, an ignition system operable to periodically ignite the fuel charge in the combustion chamber, and an exhaust system including an exhaust manifold communicating with the combustion chamber and operable to produce, in the engine exhaust gas, a thermal reaction so as to reduce engine exhaust emissions without the presence of a catalyst, which method includes the steps of pumping air unmixed with fuel to the combustion chamber, injecting fuel unmixed with air directly into the combustion chamber at a selected injecting timing and in a selected amount, igniting the fuel charge at a selected ignition timing, and controlling the fuel injection and the ignition timing so as to achieve a rate of combustion slower than that which occurs when ignition timing provides best torque and when fuel is injected at a timing so as to produce minimum fuel emissions and fuel consumption without thermal reaction within the exhaust system and in an amount so as to obtain optimum air to fuel ratio for minimum HC emissions without a thermal reaction in the exhaust system.

2. A method of operating a two-stroke internal combustion engine so as to promote reduction in engine exhaust emissions, which two-stroke internal combustion engine includes a combustion chamber, a pump operable to periodically pump air unmixed with fuel into the combustion chamber, a fuel injector communicating directly with the combustion chamber and operable to periodically inject fuel unmixed with air directly in the combustion chamber to provide a fuel charge, an ignition system operable to periodically ignite the fuel charge in the combustion chamber, and an exhaust system including an exhaust manifold communicating with the combustion chamber and operable to produce, in the engine exhaust gas, a thermal reaction so as to reduce engine exhaust emissions without the presence of a catalyst, which method includes the steps of pumping air unmixed with fuel to the combustion chamber, injecting fuel unmixed with air directly into the combustion chamber so as to provide a fuel charge and at an injecting timing which is retarded from the optimum injection timing for minimum fuel emissions and fuel consumption in an engine without thermal reaction within the exhaust system and in an amount so as to provide an air to fuel ratio which is richer than the optimum air to fuel ratio for minimum HC emissions without a thermal reaction in the exhaust system, and igniting the fuel charge at an ignition timing which is retarded from minimum spark advance for best torque.

3. A method of operating a two-stroke internal combustion engine in accordance with claim 2 wherein the step of injecting fuel is retarded by 0 to 15 degrees.

4. A method of operating a two-stroke internal combustion engine in accordance with claim 2 wherein the step of injecting fuel provides an air to fuel ratio which is one to three time richer.

5. A method of operating a two-stroke internal combustion engine in accordance with claim 2 wherein the step of injecting fuel is retarded by 0 to 15 degrees and provides an air to fuel ratio which is one to three time richer.

6. A method of operating a two-stroke internal combustion engine in accordance with claim 2 wherein the step of igniting the fuel charge is retarded by 10 to 30 degrees.

7. A method of operating a two-stroke internal combustion engine so as to promote reduction in engine exhaust emissions, which two-stroke internal combustion engine includes a combustion chamber, a crankcase operable to periodically pump air unmixed with fuel into the combustion chamber, a fuel injector communicating directly with the combustion chamber and operable to periodically inject fuel unmixed with air directly in the combustion chamber to provide a stratified fuel charge, an ignition system operable to periodically ignite the fuel charge in the combustion chamber, and an exhaust system including an exhaust manifold communicating with the combustion chamber and being operable to produce in the engine exhaust gas a thermal reaction so as to reduce engine exhaust emissions without the presence of a catalyst, which method includes the steps of pumping air unmixed with fuel to the combustion chamber, injecting fuel unmixed with air directly into the combustion chamber so as to provide a stratified fuel charge and at an injecting timing which is 10 degrees to 30 degrees retarded from the optimum injection timing for minimum fuel emissions and fuel consumption in an engine without thermal reaction within the exhaust system and in an amount so as to provide an air to fuel ratio which is one to three times richer than the optimum air to fuel ratio for minimum HC emissions without a thermal reaction in the exhaust system, and igniting the stratified fuel charge at an ignition timing which is 0 degrees to 15 degrees retarded from minimum spark advance for best torque.

8. A two-stroke internal combustion engine including a combustion chamber, a pump operable to periodically pump air unmixed with fuel into the combustion chamber, a fuel injector communicating directly with the combustion chamber and operable to periodically inject fuel unmixed with air directly in the combustion chamber to provide a fuel charge, an ignition system operable to periodically ignite the fuel charge in the combustion chamber, an electronic control unit which is connected to said fuel injector and to said ignition system, which is operable to effect fuel injection directly into the combustion chamber so as to provide a fuel charge and at an injecting timing which is retarded from the optimum injection timing for minimum fuel emissions and fuel consumption in an engine without thermal reaction within the exhaust system and in an amount so as to provide an air to fuel ratio which is richer than the optimum air to fuel ratio for minimum HC emissions without a thermal reaction in the exhaust system, and which is operable to effect operation of said ignition system at an ignition timing which is retarded from minimum spark advance for best torque, and an exhaust system including an exhaust manifold which communicates with the combustion chamber and which is operable to produce in the engine exhaust gas a thermal reaction without the presence of a catalyst so as to reduce engine exhaust emissions.

9. A two-stroke internal combustion engine in accordance with claim 8 wherein said electronic control unit operates so that fuel injection is retarded by 0 to 15 degrees.

10. A two-stroke internal combustion engine in accordance with claim 8 wherein said electronic control unit operates so as to provide an air fuel ratio which is one to three time richer.

11. A two-stroke internal combustion engine in accordance with claim 8 wherein said electronic control unit operates so that fuel injection is retarded by 0 to 15 degrees and so as to provide an air fuel ratio which is one to three times richer.

12. A two-stroke internal combustion engine in accordance with claim 8 wherein said electronic control unit operates so that ignition of the fuel charge is retarded by 10 to 30 degrees.

13. A two-stroke internal combustion engine including a combustion chamber, a crankcase operable to periodically pump air unmixed with fuel into the combustion chamber, a fuel injector communicating directly with the combustion chamber and operable to periodically inject fuel unmixed with air directly in the combustion chamber to provide a stratified fuel charge, an ignition system operable to periodically ignite the fuel charge in the combustion chamber, an electronic control unit which is connected to said fuel injector and to said ignition system, which is operable to effect fuel injection directly into the combustion chamber so as to provide a stratified fuel charge and at an injecting timing which is 10 degrees to 30 degrees retarded from the optimum injection timing for minimum fuel emissions and fuel consumption in an engine without thermal reaction within the exhaust system and in an amount so as to provide an air to fuel ratio which is one to three times richer than the optimum air to fuel ratio for minimum HC emissions without a thermal reaction in the exhaust system, and which is operable to effect operation of said ignition system at an ignition timing which is 0 degrees to 15 degrees retarded from minimum spark advance for best torque, and an exhaust system including an exhaust manifold which communicates with the combustion chamber and which is operable to produce in the engine exhaust gas a thermal reaction without the presence of a catalyst so as to reduce engine exhaust emissions.

* * * * *